(12) United States Patent
Salerno

(10) Patent No.: US 12,000,522 B2
(45) Date of Patent: Jun. 4, 2024

(54) COMBINED AIR SYSTEM

(71) Applicant: Rivian IP Holdings, LLC, Plymouth, MI (US)

(72) Inventor: Jonathan David Salerno, Newport, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/938,098

(22) Filed: Oct. 5, 2022

(65) Prior Publication Data

US 2024/0117899 A1 Apr. 11, 2024

(51) Int. Cl.
| | | |
|---|---|---|
| F16L 7/00 | (2006.01) | |
| B60G 17/015 | (2006.01) | |
| B60S 5/04 | (2006.01) | |

(52) U.S. Cl.
CPC ............ *F16L 7/00* (2013.01); *B60G 17/0155* (2013.01); *B60S 5/046* (2013.01)

(58) Field of Classification Search
CPC ....... F16L 7/00; B60G 17/0155; B60G 21/06; B60S 5/046; B60C 23/10; B21K 1/14; B21K 1/16; B05B 1/3489; B29C 2045/2791
See application file for complete search history.

(56) References Cited

U.S. PATENT DOCUMENTS

| | | | | |
|---|---|---|---|---|
| 5,997,256 | A * | 12/1999 | Gunther | ................ F04B 33/005 |
| | | | | 417/259 |
| 2015/0300550 | A1* | 10/2015 | Shelton | .................... B67D 7/82 |
| | | | | 392/468 |
| 2019/0039431 | A1* | 2/2019 | Vaughan | ............. F15B 13/0406 |
| 2019/0263362 | A1* | 8/2019 | Hammer | ............... B60C 29/064 |
| 2020/0070785 | A1* | 3/2020 | Mullins | .................... B60S 5/043 |
| 2023/0150329 | A1* | 5/2023 | Coombs | .............. F15B 13/0814 |
| | | | | 280/124.16 |
| 2023/0382165 | A1* | 11/2023 | Hennig | ............. B60C 23/00309 |

FOREIGN PATENT DOCUMENTS

| | | | | |
|---|---|---|---|---|
| AT | 406135 B | * | 1/2000 | ............. B60C 29/06 |
| EP | 2949980 A1 | * | 12/2015 | ........... B23K 26/342 |

OTHER PUBLICATIONS

Description Translation for EP 2949980 from Espacenet (Year: 2015).*

* cited by examiner

*Primary Examiner* — Jason D Shanske
*Assistant Examiner* — Daniel M. Keck
(74) *Attorney, Agent, or Firm* — Foley & Lardner LLP

(57) ABSTRACT

An apparatus can include a first tube. The apparatus can include a manifold coupled to the first tube. The manifold can have an opening. The apparatus can include a second tube at least partially disposed in the first tube. The second tube can enter the first tube via the opening of the manifold.

20 Claims, 12 Drawing Sheets

COMBINED AIR SYSTEM

INTRODUCTION

Air systems can provide air or remove air (e.g., a vacuum) for different purposes.

SUMMARY

Separate air systems can be used to provide high pressure (HP) air and low pressure (LP) air. Providing HP and LP air can require separate hose systems based on what type of air is needed. The technical solution described herein provides a combined air system that can provide HP and LP air via a single hose assembly. For example, the hose assembly can have a first hose and a second hose. The second hose can be disposed, at least partially, in the first hose. The first hose can provide LP air and the second hose can provide HP air. An end of the first hose and an end of the second hose can be disposed at or proximate to an end of the hose assembly such that the hose assembly can provide HP or LP air based on what a user wants. Using a single hose assembly to provide HP and LP air reduces the number of separate hoses or hose assemblies needed for various tasks and simplifies the process of determining what hose is needed for what task.

At least one aspect is directed to an apparatus. The apparatus can include a first hose. The apparatus can include a manifold coupled to the first hose. The manifold can have an opening. The apparatus can include a second hose at least partially disposed in the first hose. The second hose can enter the first hose via the opening of the manifold.

At least one aspect is directed to a method. The method can include coupling a manifold with a first hose. The manifold can include an opening. The method can include inserting a portion of a second hose into the first hose via the opening of the manifold. The first hose can provide air with a first pressure and the second hose can provide air with a second pressure, the first pressure lower than the second pressure.

At least one aspect is directed to a vehicle. The vehicle can include a combined air system. The combined air system can include a first hose. The combined air system can include a manifold coupled to the first hose. The manifold can have an opening. The combined air system can include a second hose. The second hose can be disposed, at least partially, in the first hose. The second hose can enter the first hose via the opening of the manifold. The vehicle can include an air pump to couple with the first hose. The vehicle can include a compressor to couple with the second hose.

At least one aspect is directed to a method. The method can include providing a first hose to provide a first pressure and a first volume of air. The method can include providing a second hose to provide a second pressure and a second volume of air. The first pressure can be less than the second pressure. The first volume can be greater than the second volume. The second hose can be disposed at least partially within the first hose.

At least one aspect is directed to a method. The method can include providing a combined air system. The combined air system can include a first hose. The combined air system can include a manifold coupled with the first hose. The manifold can have an opening. The combined air system can include a second hose. The second hose can be disposed, at least partially, in the first hose. The second hose can enter the first hose via the opening of the manifold.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of a combined air system. The various concepts introduced above and discussed in greater detail below may be implemented in any of numerous ways.

The present disclosure is directed to systems and methods for combining a high-pressure, low volume air system with a low-pressure, high-volume air system. The disclosed solutions have a technical advantage of using the same air hose assembly to inflate a variety of different objects that have different inflation requirements. For example, the disclosed solutions can provide high pressure, low volume air to inflate a tire as well as low pressure, high volume air to inflate a mattress, among other objects. The disclosed solutions can also provide a vacuum function within the same combined air system. Instead of having to buy separate systems and determine which system is needed for a particular task, the disclosed solution provides these capabilities via a single system.

The disclosed solutions can include a high pressure (HP) hose disposed, at least partially, within a low pressure (LP) hose. The system can include a manifold that is in line with the LP hose. The manifold can include an opening to receive the HP hose. The HP hose can enter the LP hose at the opening and extend along a length of the LP hose. An end of the LP hose can be disposed proximate to an end of the HP hose such that both ends can be accessible for a desired task. The system can include at least one hose support disposed within the LP hose to position the HP hose inside the LP hose at a desired location (e.g., centered within the LP hose or disposed along a side of the LP hose).

The disclosed solutions have a technical advantage of providing a single system to provide both HP air and LP air using a single hose assembly. Combining the first hose with the second hose allows a user to use the same hose assembly for various tasks that can have different air requirements. For example, a user can use the disclosed solution to inflate a tire (which can use HP air), to inflate a mattress (which can use LP air), and to vacuum a space (which can use LP of HP air). The combined air system can reduce the number of hoses needed to perform different tasks and simplify the decision process for determining which system is needed for each task.

Figure 1:
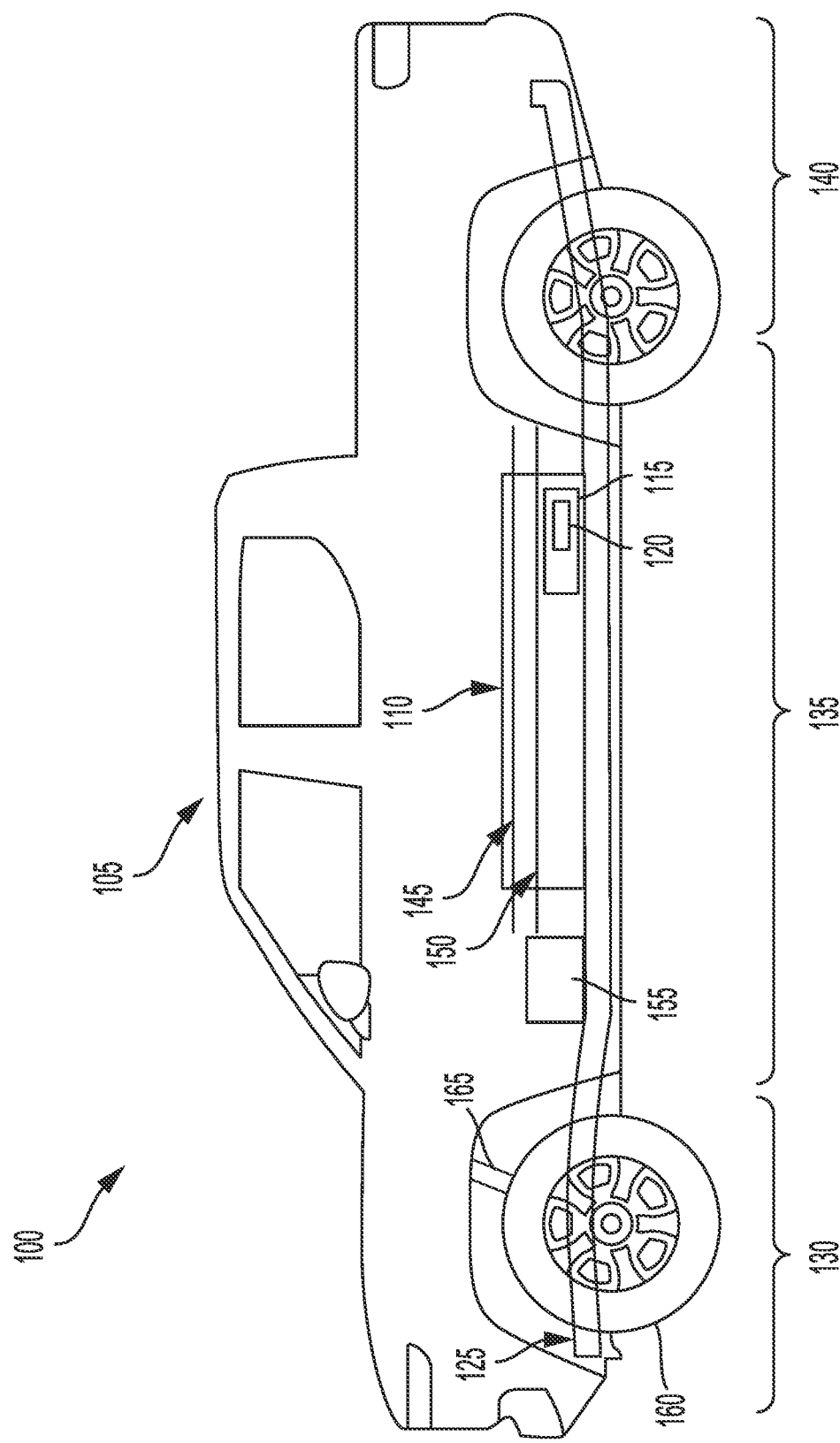
FIG. 1 depicts a side view of an example vehicle, in accordance with some aspects.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

The electric vehicle 105 can include at least one fluid controller 155. The fluid controller 155 can be any device that can control or generate an air flow. For example, the fluid controller can be an air pump, a compressor, or a vacuum, among other devices. The electric vehicle 105 can include at least one tire 160. The fluid controller 155 can generate an air flow to inflate or deflate the tire 160. The electric vehicle 105 can include at least one suspension system 165. The suspension system can be, for example, and air suspension system 165. The fluid controller 155 can generate an air flow to control the air suspension system 165.

Figure 2:
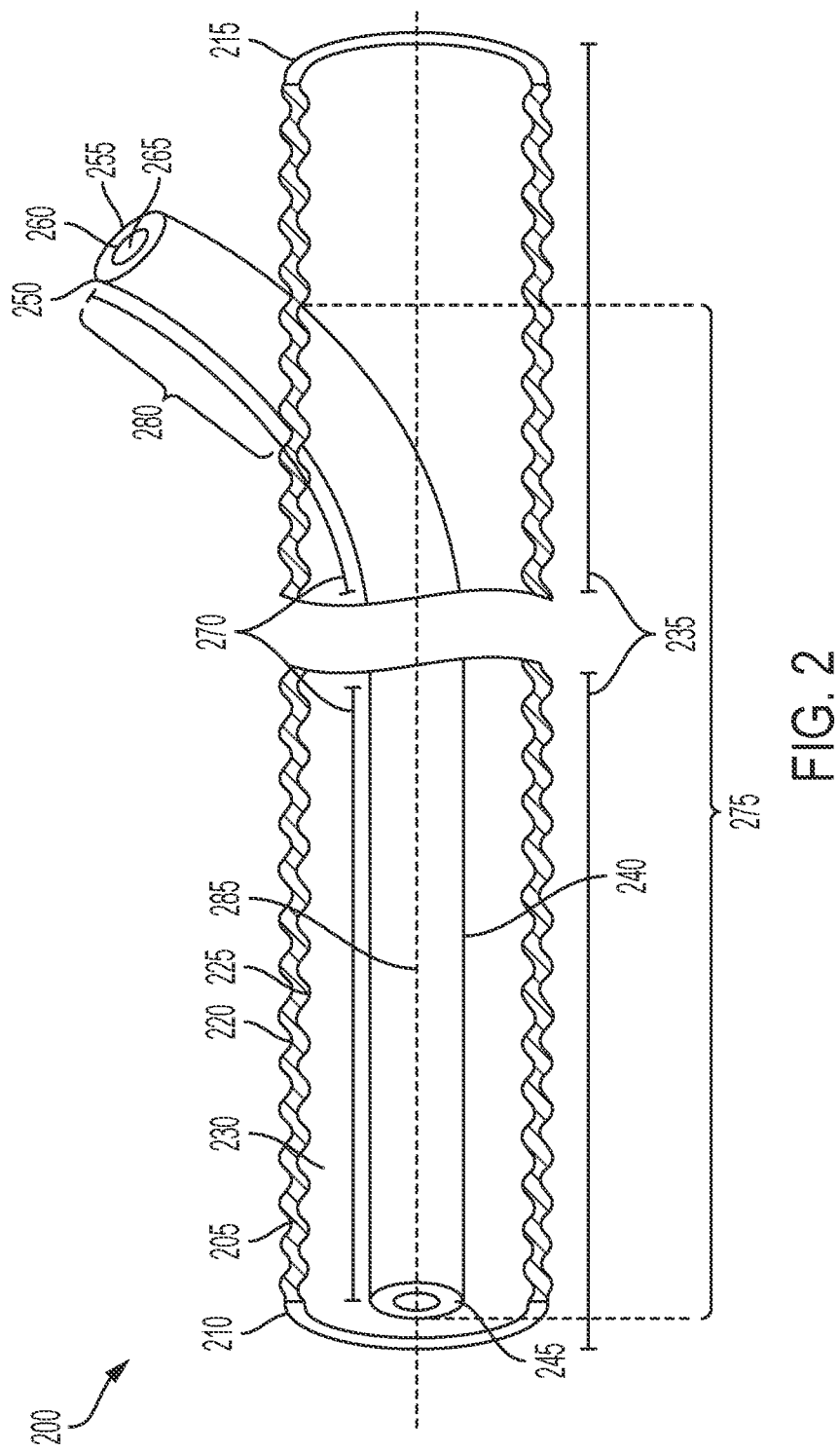
FIG. 2 depicts a side cross-sectional view of an example apparatus, in accordance with some aspects.

FIG. 2 depicts a cross-sectional view of an example apparatus, shown as hose assembly 200. The hose assembly 200 can be or can include a combined air system. The hose assembly 200 can include a first hose, shown as outer hose 205. The outer hose 205 can have a first end, shown as an outer hose front end 210, and a second end, shown as outer hose rear end 215. The outer hose 205 can have at least one external wall 220 and at least one internal wall 225. The external wall 220 can be exposed to an external environment. The internal wall 225 can define at least one cavity 230. The cavity 230 can receive at least one other component of the hose assembly 200. The external wall 220 and the internal wall 225 can extend between the outer hose front end 210 and the outer hose rear end 215. The outer hose 205 can have a length, shown as outer hose length 235. The outer hose length 235 can extend between the outer hose front end 210 and the outer hose rear end 215.

The outer hose 205 can provide a passage for a fluid (e.g., liquid, gas). For example, gas (e.g., air) can travel between the outer hose front end 210 and the outer hose rear end 215 via the cavity 230. The outer hose 205 can provide a first volume of gas at a first pressure. For example, the gas can be a high volume, low pressure (LP) gas. The outer hose rear end 215 can couple with a device, for example a fluid controller 155. The device can push air through the cavity 230 of the outer hose 205. For example, the air can be pushed from the outer hose rear end 215 toward the outer hose front end 210. The device can pull air through the cavity 230 of the outer hose 205. For example, the air can be pulled from the outer hose front end 210 toward the outer hose rear end 215 (e.g., a vacuum). The outer hose front end 210 can couple with an object, for example an inflatable mattress. The object can receive or provide the fluid (e.g., air) that can be pushed or pulled via the device. For example, the inflatable mattress can receive air to inflate the mattress or provide the air to deflate the mattress.

The hose assembly 200 can include a second hose, shown as inner hose 240. The inner hose 240 can be disposed, at least partially, in the cavity 230 of the outer hose 205. The inner hose 240 can have a first end, shown as inner hose front end 245, and a second end, shown as inner hose rear end 250. The inner hose front end 245 can be disposed in the cavity 230 of the outer hose 205 and the inner hose rear end 250 can be disposed outside of the outer hose 205. The inner hose 240 can have at least one outer wall 255 and at least one inner wall 260. The outer wall 255 can be exposed in the cavity 230. The inner wall 260 can define at least one channel 265. The outer wall 255 and the inner wall 260 can extend between the inner hose front end 245 and the inner hose rear end 250. The inner hose 240 can have a length, shown as inner hose length 270. The inner hose length 270 can extend between the inner hose front end 245 and the inner hose rear end 250.

The inner hose 240 can provide a passage for a fluid (e.g., liquid, gas). For example, gas (e.g., air) can travel between the inner hose front end 245 and the inner hose rear end 250 via the channel 265. The inner hose 240 can provide a second volume of gas at a second pressure. For example, the gas can be a low volume, high pressure (HP) gas. The first volume can be greater than the second volume. The first pressure can be less than the second pressure. The inner hose rear end 250 can couple with a device, for example a fluid controller 155. The inner hose rear end 250 and the outer hose rear end 215 can couple with the same device or a different device. The device can push air through the channel 265 of the inner hose 240. For example, the air can be pushed from the inner hose rear end 250 toward the inner hose front end 245. The device can pull air through the channel 265 of the outer hose 205. For example, the air can be pulled from the inner hose front end 245 toward the inner hose rear end 250 (e.g., a vacuum). The inner hose front end 245 can couple with an object, for example a tire 160. The object can receive or provide the fluid (e.g., air) that can be pushed or pulled via the device. For example, the tire 160 can receive air to inflate the tire 160 or provide the air to deflate the tire 160.

The inner hose 240 can have a first portion, shown as front portion 275, and a second portion, shown as rear portion 280. The front portion 275 can extend within the cavity 230 of the outer tube 205 and the rear portion 280 can extend external to the outer tube 205. At least part of the front portion 275 can extend substantially parallel (e.g., +/−10%) with the outer tube 205. For example, the front portion 275 can be disposed centrally within the cavity 230. For example, the outer tube 205 can have a central axis 285. At least part of the front portion 275 can extend along the central axis 285. The front portion 275 can be offset from the central axis 285. For example, at least a part of the front portion 275 can extend along the internal wall 225 of the outer tube 205.

Figure 3:
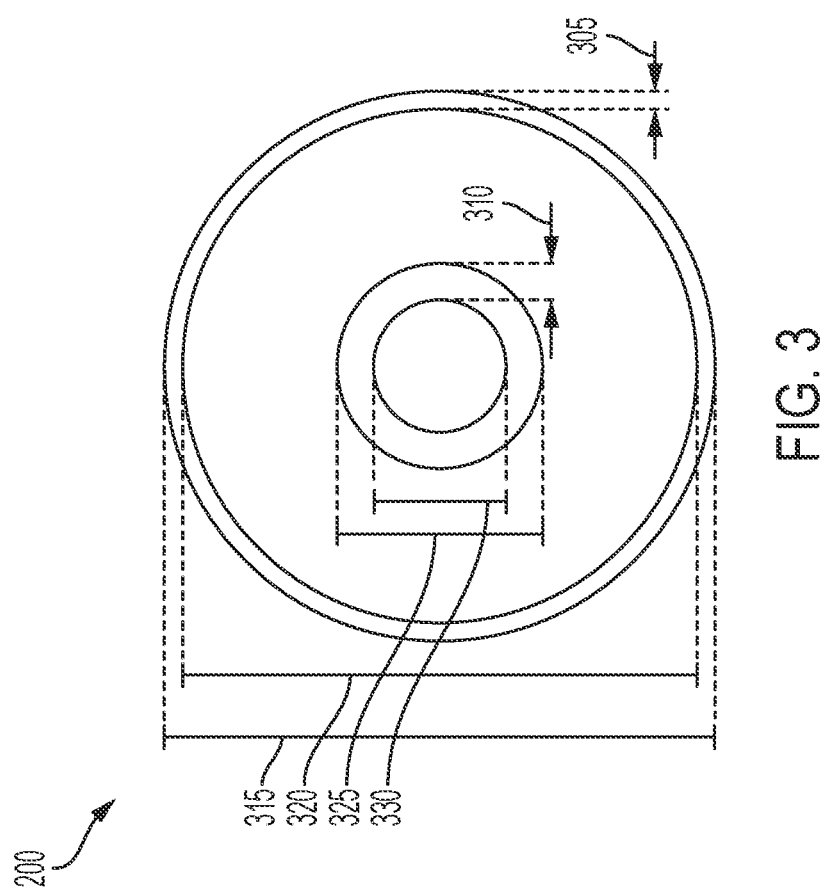
FIG. 3 depicts a front cross-sectional view of an example apparatus, in accordance with some aspects.

FIG. 3 depicts a cross-sectional view of the hose assembly 200. A distance between the external wall and the internal wall 225 of the outer hose 205 can be a first wall thickness 305. A distance between the outer wall 255 and the inner wall 260 of the inner hose 240 can be a second wall thickness 310. The first wall thickness 305 can be less than the second wall thickness 310. The second wall thickness 310 can withstand a higher internal pressure than the first wall thickness 305. For example, the second wall thickness can withstand up to 300 psi. The second wall thickness 310 can withstand pressures higher or lower than 300 psi.

The outer hose 205 can have a first outer diameter 315 and a first inner diameter 320. The first inner diameter 320 can be less than the first outer diameter 315. The inner hose 240 can have a second outer diameter 325 and a second inner diameter 330. The second inner diameter 330 can be less than the second outer diameter 325. The second outer diameter 325 can be less than the first inner diameter 320. For example, the first inner diameter 320 can be approximately 2.0 inches (+/−10%). The second outer diameter 325 can be approximately 0.5 inches (+/−10%). A cross-sectional area of the inner hose 240 can be less than a cross-sectional area of the outer tube 205. For example, the cross-sectional area of the inner hose 240 can be less than 50% of the cross-sectional area of the outer tube 205. For example, inner hose 240 can have cross-sectional area of approximately 1.57 inches (+/−10%) and the outer tube 205 can have a cross-sectional area of approximately 6.28 inches (+/−10%). The cross-sectional area of the inner hose 240 can be more than 50% of the cross-sectional area of the outer tube 205. The outer hose 205 and the inner hose 240 can be any type of hose. For example, the outer hose 205 can be a flexible corrugated hose. The inner hose 240 can be a flexible, non-corrugated (e.g., smooth surface) hose.

Figure 4:
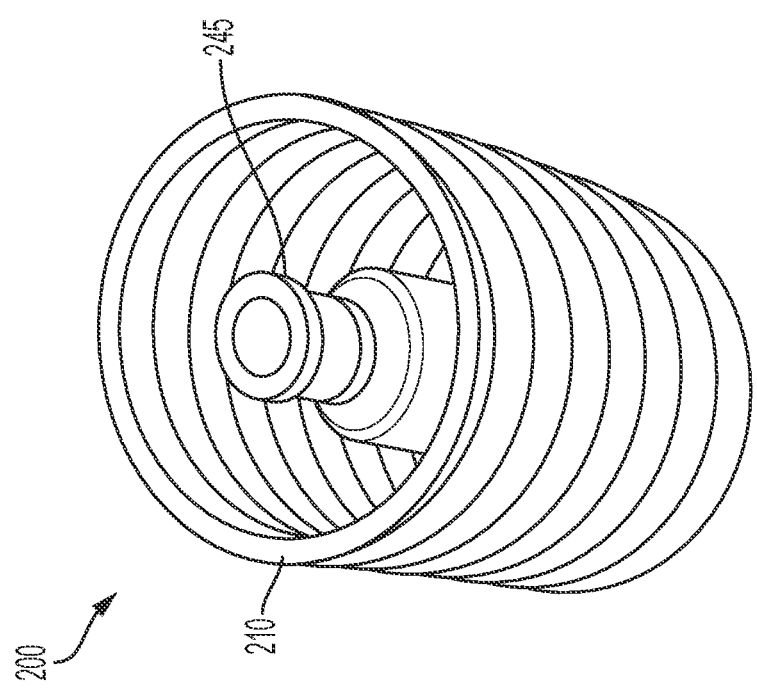
FIG. 4 depicts a top perspective view an example apparatus, in accordance with some aspects.

FIG. 4 depicts a perspective view of the hose assembly 200. The inner hose front end 245 can be disposed proximate to the outer hose front end 210. The inner hose front end 245 can be exposed at the outer hose front end 210. For example, an object to be inflated or deflated can interface with the inner hose front end 245 at the outer hose front end 210. The inner hose front end 245 can extend beyond the outer hose front end 210. The outer hose front end 210 can extend beyond the inner hose front end 245. The inner hose front end 245 can be disposed centrally within the outer hose front end 210. For example, the inner hose front end 245 can be disposed along the central axis 285 of the outer hose 205.

Figure 5:
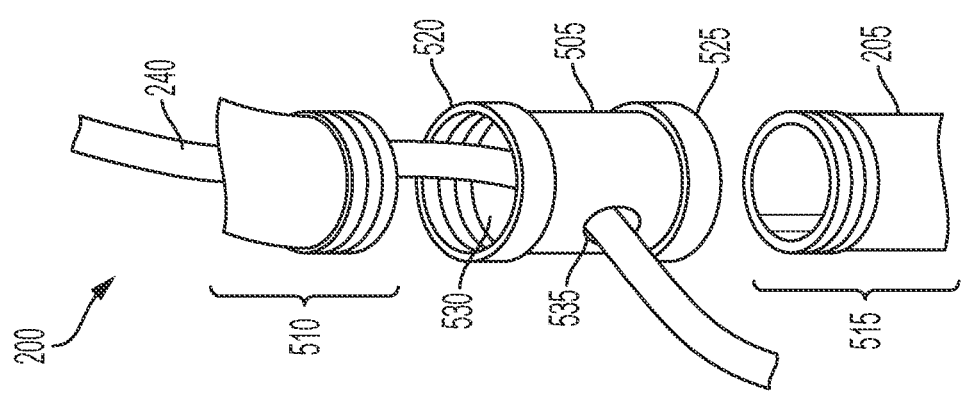
FIG. 5 depicts an exploded view of an example apparatus, in accordance with some aspects.

FIG. 5 depicts an exploded view of the hose assembly 200. The hose assembly 200 can include at least one manifold 505. The manifold 505 can be coupled with the outer hose 205. For example, the manifold 505 can be in line with the outer hose 205. The manifold 505 can divide the outer hose 205 into a front portion 510 and a rear portion 515. The front portion 510 can include the outer hose front end 210 and the rear portion 515 can include the outer hose rear end 215. The manifold 505 can be coupled with the outer hose 205 by any coupling means. For example, the manifold 505 can have a first manifold end 520 and a second manifold end 525. The first manifold end 520 can couple with the front portion 510 of the outer hose 205. The second manifold end 525 can couple with the rear portion 515 of the outer hose 205. For example, the first manifold end 520 and the second manifold end 525 can be threaded to interface with threaded portions of the front portion 510 and the rear portion 515 of the outer hose 205. The manifold 505 can couple with the outer hose 205 by mechanical fasteners (e.g., bolts), welding, and adhesives, among others.

The manifold 505 can be disposed at any location along the length 235 of the outer tube 205. For example, the manifold 505 can be disposed closer to the outer hose front end 210 than the outer hose rear end 215 such that the front portion 510 of the outer tube 205 is shorter than the rear portion 515. The manifold 505 can be disposed closer to the outer hose rear end 215 such that the front portion 510 of the outer tube 205 is longer than the rear portion 515. The manifold 505 can be disposed centrally between the outer hose rear end 215 and the outer hose front end 210. The manifold 505 can be disposed at the outer hose front end 210 or the outer hose rear end 215. For example, the outer tube 205 can comprise one continuous portion and the manifold 505 can couple to the outer hose front end 210. The first manifold end 520 can be the end of the hose assembly 200 and the inner hose front end 245 can be accessed via the first manifold end 520. The manifold 505 can provide passage for a fluid to flow. For example, the manifold 505 can define a manifold cavity 530. With the manifold 505 dividing the outer hose 205 into a front portion 510 and a rear portion 515, the fluid can travel between the front portion 510 and the rear portion 515 via the manifold cavity 530. With the manifold 505 disposed at the outer hose front end 210, the fluid can travel through the outer hose 205 and out of the hose assembly 200 via the first manifold end 520.

The manifold 505 can include at least one opening 535. The opening 535 can extend from an exterior of the manifold 505 to the manifold cavity 530. The opening 535 can receive at least one component of the hose assembly 200. For example, the inner hose 240 can enter the outer hose 205 via the opening 535. The inner hose 240 can enter the outer hose 205 via the opening 535 and continue to extend within the cavity 230 and along the front portion 510 of the outer hose 205. The front portion 275 of the inner hose 240 can be disposed in the cavity 230 and the rear portion 280 can remain external to the outer tube 205. The opening 535 can extend through the external and internal wall 220, 225 of the outer hose 205 instead of a manifold 505. The opening 535 can include a seal to prevent air fluid from escaping the outer hose 205 via the opening 535. With the manifold 505 disposed closer to the outer hose rear end 215 than the inner hose rear end 250, a majority of the inner hose 240 can be disposed in the cavity 230 of the outer tube 205. The opening 535 can be disposed approximately halfway between the first manifold end 520 and the second manifold end 525. The size of the opening 535 can be based on the second outer diameter 325. For example, the size of the opening can be large enough such that the inner hose 240 can extend through the opening 535. The size of the opening can be small enough such that most of the fluid flowing through the outer hose 205 does not escape through the opening 535.

Figure 6:
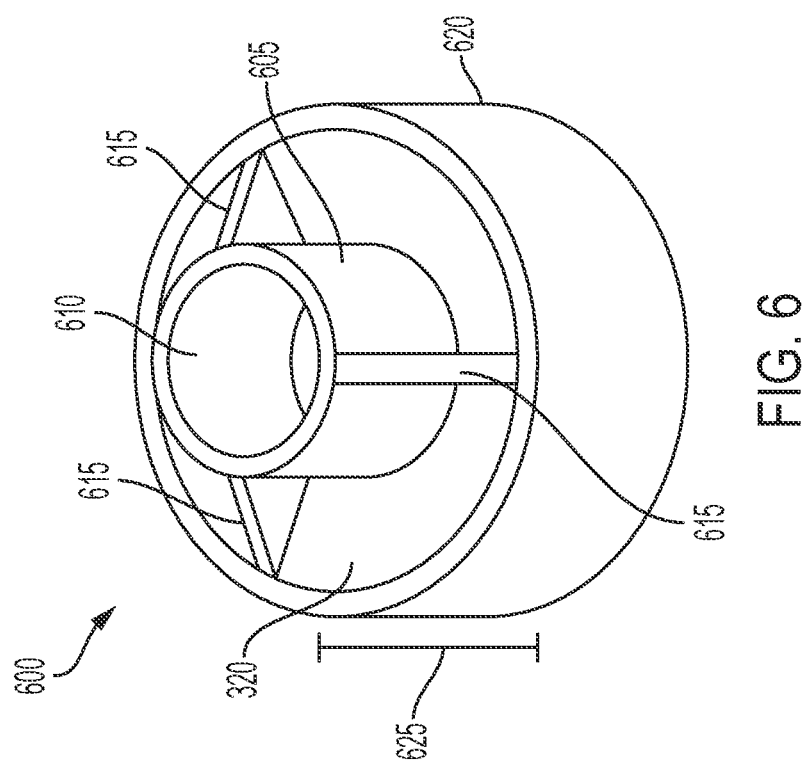
FIG. 6 depicts a top perspective view of an example support structure, in accordance with some aspects.

FIG. 6 depicts a top perspective view of a support structure 600. The hose assembly 200 can include at least one support structure 600. For example, the support structure 600 can be disposed in the outer hose 205. The support structure 600 can be disposed within the cavity 230 of the front portion 510 of the outer hose 205. The support structure 600 can be disposed in the manifold 505. The support structure 600 can include at least one support body 605. The support body 605 can define a support aperture 610. The support aperture 610 can extend through the support body 605. The support aperture 610 can receive the portion of the inner hose 240. The support structure 600 can position at least a portion of the inner hose 240 at a desired location within the outer hose 205. For example, the support structure 600 can fix at least a portion of the second hose at a radial position relative to an internal wall 225 of the outer hose 205. The support structure 600 can include at least one support member 615. The support member 615 can extend from the support body 605. The support member 615 can position the support body 605 at a location away from the internal wall 225 of the outer hose 205. For example, the support member 615 can extend between the support body 605 and the internal wall 225 of the outer hose 205. A distance the support body 605 is away from the internal wall 225 can be based on a length of the support member 615.

The support structure 600 can have a perimeter wall 620. With the support structure 600 disposed in the cavity 230, the perimeter wall 620 can interface with the internal wall 225 of the outer hose 205. The support member 615 can extend between the support body 605 and the perimeter wall 620. Without the perimeter wall 620, the support member 615 can extend between the support body 605 and the internal wall 225 of the outer hose 205.

The support structure 600 can have a length 625. The length 625 can be any length. For example, the support structure 600 can have any length 625 that provides adequate support for the inner hose 240. The support structure 600 can, for example, extend a majority of the distance between the opening 535 and the outer hose front end 210 or can extend a short distance just to provide support for the inner hose 240 at a desired location.

Figure 7:
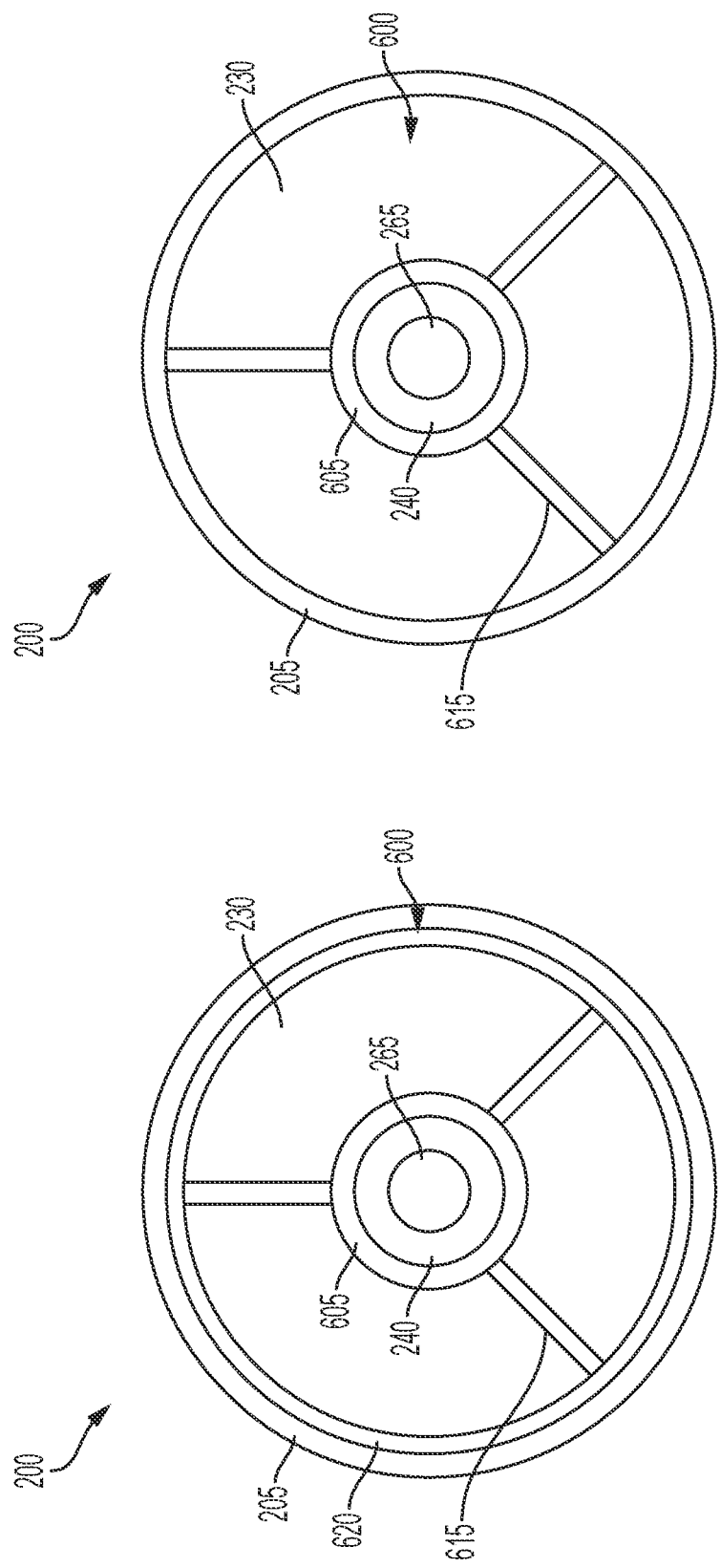
FIG. 7 depicts front cross-sectional views of example apparatuses, in accordance with some aspects.

FIG. 7 depicts a cross-sectional view of the hose assembly 200. The support structure 600 can have a plurality of support members 615. For example, the support structure 600 can include a plurality of support members 615 disposed equidistant around the support body 605. The plurality of support members 615 can extend radially from the support body 605. The plurality of support member 615 can position the support body 605 at a position away from the internal wall 225 of the outer hose 205. For example, the plurality of support members 615 can dispose the support body 605 centrally within the cavity 230 (e.g., along the central axis 285). For example, the plurality of support members 615 can have the same length. A positioning of the inner hose 240 can be based on a location of the support body 605. For example, a portion of the inner hose 240 can be disposed in the support body 605. A support body 605 located centrally within the outer hose 205 can position at least the portion of the inner hose 240 received via the support aperture 610 centrally within the outer hose 205. The plurality of support members 615 can also dispose the support body 605 offset from the central axis 285. For example, the plurality of support members 615 can have different lengths.

The support structure 600 can have the perimeter wall 620. The perimeter wall 620 can interface with the internal wall 225 of the outer hose 205. The plurality of support members 615 can extend from the support body 605 to the perimeter wall 620. The support structure 600 can also not have the perimeter wall 620. For example, the plurality of support member 615 can extend from the support body 605 to the internal wall 225 of the outer hose 205.

Figure 8:
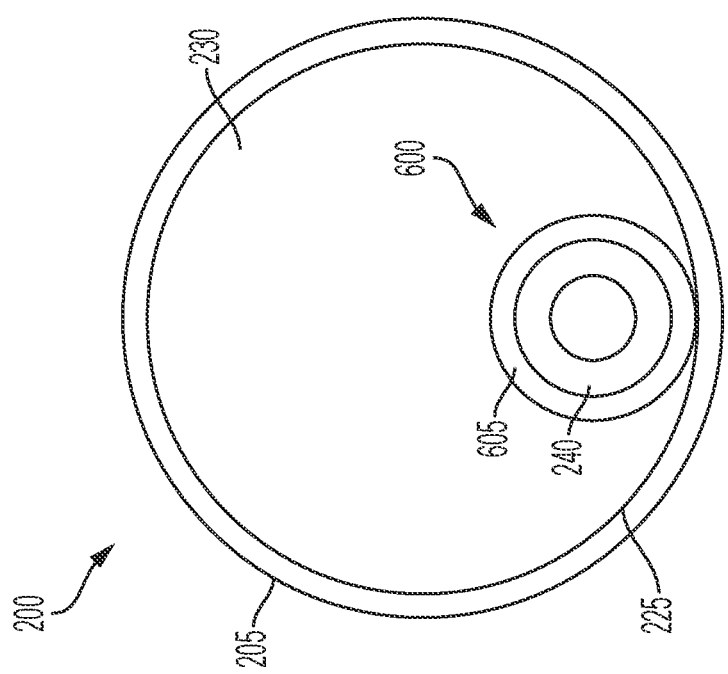
FIG. 8 depicts a front cross-sectional view of an example apparatus, in accordance with some aspects.

FIG. 8 depicts a cross-sectional view of the hose assembly 200. The support structure 600 can have no support members 615. For example, the support structure 600 can include the support body 605 disposed along the internal wall 225 of the outer hose 205. The support body 605 can be coupled with or integral with the internal wall 225 of the outer hose 205. The support body 605 can be offset from the central axis 285. The support body 605 can position at least the portion of the inner hose 240 received via the support aperture 610 offset from the central axis 285 within the outer hose 205.

Figure 9:
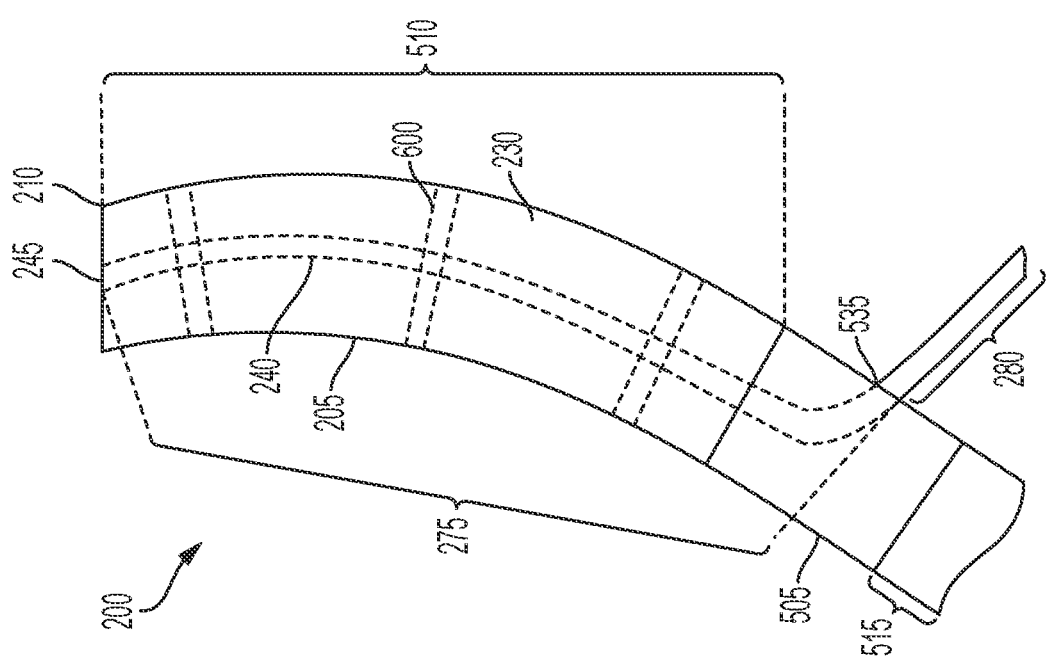
FIG. 9 depicts a side view of an example apparatus, in accordance with some aspects.

FIG. 9 depicts a top view of the hose assembly 200. The hose assembly 200 can have the manifold 505 disposed at any location along the outer tube 205. The inner hose 240 can enter the outer tube 205 via the opening 535 of the manifold 505. The inner hose 240 can extend in the cavity 230 from the opening 535 toward the outer hose front end 210. The hose assembly 200 can include at least one support structure 600. The support structure 600 can be disposed at any location along the front portion 510 of the outer hose 205. For example, the support structure 600 can be disposed proximate to the outer hose front end 210. The support structure 600 at the outer hose front end 210 can position the inner hose front end 245 at a desired location (e.g., centrally) within the outer hose front end 210.

The hose assembly 200 can include a plurality of support structures 600. For example, the hose assembly 200 can include a plurality of support structures 600 disposed in the outer hose 205. The plurality of support structures 600 can be disposed intermittently between the opening 535 and the outer hose front end 210. The plurality of support structures 600 can be evenly space along the outer hose 205. At least one of the plurality of support structures 600 can be disposed in the manifold 505. The plurality of support structures 600 can include a support body 605 disposed at the same position. For example, the support body 605 for each support structure 600 can be disposed centrally within the cavity 230 of the outer hose 205. The support body 605 for each support structure 600 can also be disposed offset from the central axis 285.

Vehicles can include at least one hose assembly 200. For example, electric vehicle 105 can include hose assembly 200 (e.g., a combined air system). The hose assembly 200 can include any combination of features described herein. For example, the hose assembly 200 can include an outer hose 205. The hose assembly 200 can include a manifold 505 coupled with the outer hose 205. The manifold 505 can include an opening 535. The hose assembly 200 can include an inner hose 240. The inner hose 240 can be disposed, at least partially, in the outer hose 205. The inner hose 240 can enter the outer hose 205 via the opening 535 of the manifold 505. The hose assembly 200 can include at least one support structure 600. The support structure 600 can be disposed in the outer hose 205. The support structure 600 can include a support body 605. The support body 605 can define a support aperture 610. The support aperture 610 can receive at least a portion of the inner hose 240. The support structure 600 to position the inner hose 240 at a desired position within the outer hose 205. For example, the support structure 600 can position the inner hose 240 centrally within the outer hose 205 to align with the central axis 285 of the outer hose 205. The support structure 600 can position the inner hose 240 offset from the central axis 285 of the outer hose 205. The position of the inner hose 240 can be based on a location of the support body 605.

The electric vehicle 105 can include at least one fluid controller 155. The fluid controller 155 can be any device or system capable of providing, directing, generating, or otherwise controlling a fluid (e.g., an air source). For example, the electric vehicle 105 can include a first fluid controller 155 (e.g., an air pump). The first fluid controller 155 can provide a fluid at a first pressure and a first volume. The first fluid controller can couple with the outer hose 205 of the hose assembly 200. The fluid can travel from the first fluid controller 155 through the outer hose 205 to a first receiver (e.g., an inflatable mattress). The first receiver can be any external object or vehicle component that can receive the fluid at the first pressure and the first volume.

The electric vehicle 105 can include a second fluid controller 155 (e.g., a compressor). The second fluid controller 155 can provide a fluid at a second pressure and a second volume. The second pressure can be higher than the first pressure and the second volume can be less than the first volume. The second fluid controller 155 can couple with the inner hose 240 of the hose assembly 200. The fluid can travel from the second fluid controller 155 through the inner hose 240 to a second receiver (e.g., tire 160, suspension system 165). The second receiver can be any external object or vehicle component that can receive the fluid at the second pressure and the second volume. For example, the electric vehicle 105 can include a suspension system 165. The second fluid controller 155 can supply air to the suspension system 165 via the inner hose 240. The electric vehicle 105 can include a tire 160. The second fluid controller 155 can provide the air with the second pressure and the second volume to the tire 160.

Figure 10:
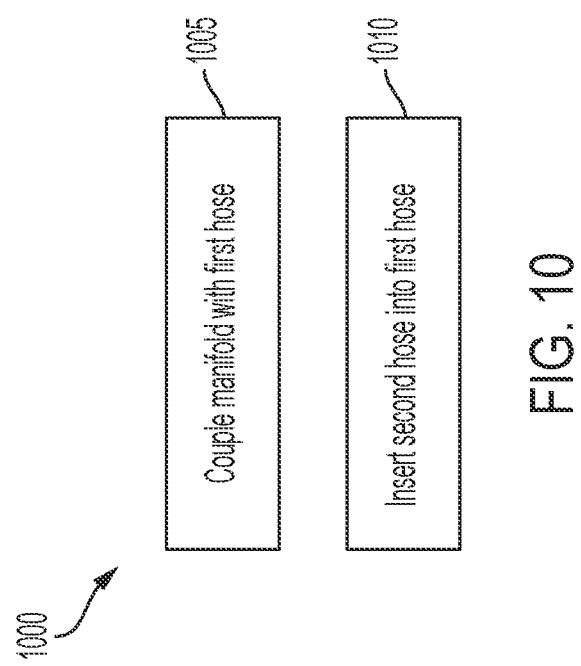
FIG. 10 depicts a flow diagram illustrating an example method to assemble an apparatus, in accordance with some aspects.

FIG. 10 depicts an example method 1000 to assemble a hose assembly 200. Method 1000 can include coupling a manifold with a first hose (Act 1005) and inserting a portion of a second hose into the first hose (Act 1010). Act 1005 can include coupling a manifold 505 with an outer hose 205. The manifold 505 can have an opening 535. Act 1010 can include inserting at least a portion of an inner hose 240 into the outer hose 205. The inner hose 240 can be inserted into the outer hose 205 via the opening 535 of the manifold 505. The outer hose 205 can provide a first air pressure and a first air volume and the inner hose 240 can provide a second air pressure and a second air volume. The first air pressure can be less than the second air pressure. The first air volume can be more than the second air volume.

Act 1010 can include fixing at least one support structure 600 at a location within the outer hose 205. The support structure 600 can include a support body 605. The support body 605 can define a support aperture 610. The support aperture 610 can receive at least a portion of the inner hose 240. Act 1010 can include positioning the support body 605 at a position away from an internal wall 225 of the outer hose 205. For example, the support body 605 can include a plurality of support members that extend radially from the support body 605 toward the internal wall 225. Act 1010 can include positioning the inner hose 240 in the outer hose 205 at a desired position via the support body 605. For example, the support aperture 610 can receive at least a portion of the inner hose 240 and hold the portion of the inner hose 240 at the desired position. Act 1010 can include sealing the opening 535 around the inner hose 240. Sealing the opening 535 can include preventing a low pressure air from escaping the outer hose 205.

Act 1010 can include positioning the inner hose front end 245 proximate to the outer hose front end 210. For example, the inner hose front end 245 can be positioned such that the inner hose front end 245 can be accessible to a user at the outer hose front end 210. The inner hose front end 245 can be positioned such that the inner hose 240 can provide the second air pressure and the second air volume to an external object.

Figure 11:
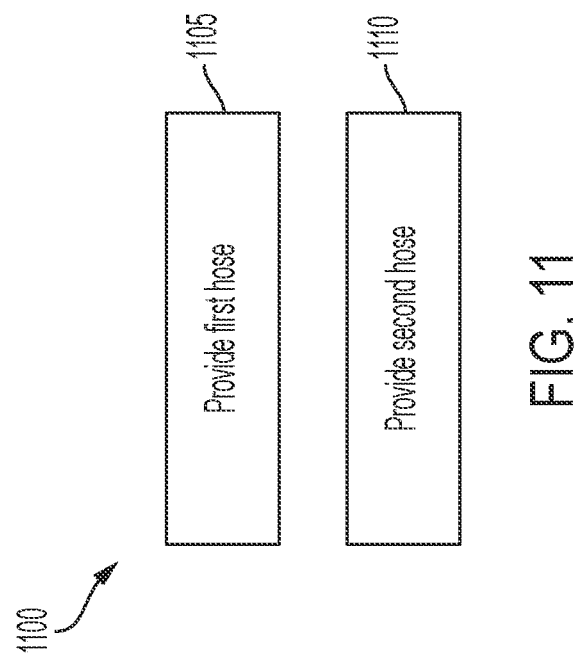
FIG. 11 depicts a flow diagram illustrating an example method to provide an apparatus, in accordance with some aspects.

FIG. 11 depicts an example method 1100 to provide a hose assembly. Method 1100 can include providing a first hose (Act 1105) and providing a second hose (Act 1110). Act 1105 can include providing outer hose 205. The outer hose 205 can provide a first pressure of fluid (e.g., air) and a first volume of fluid. The outer hose 205 can include any combination of features described herein. Act 1110 can include providing inner hose 240. The inner hose 240 can provide a second pressure of fluid and a second volume of fluid. The first pressure can be less than the second pressure. The first volume can be more than the second volume. The inner hose 240 can include any combination of features described herein. Act 1110 can include inserting the inner hose 240, at least partially, into the outer hose 205.

Figure 12:
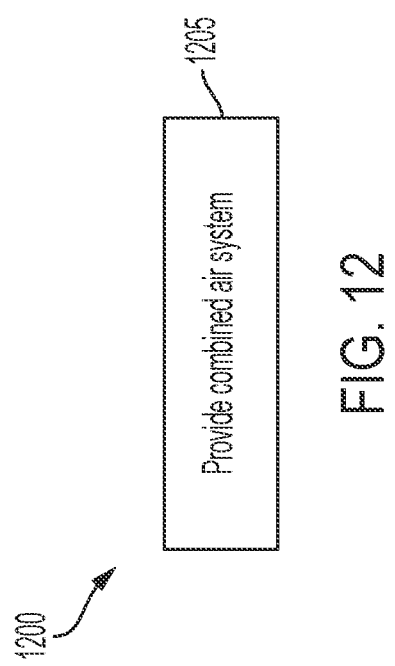
FIG. 12 depicts a flow diagram illustrating an example method to provide an apparatus, in accordance with some aspects.

FIG. 12 depicts an example method 1200 to provide a combined air system. Method 1200 can include providing a combined air system (Act 1205). Act 1205 can include providing the combined air system, shown as hose assembly 200. The hose assembly 200 can include any combination of features described above. For example, the hose assembly can include a first hose. The first hose can be an outer hose 205. The hose assembly 200 can include a manifold 505. The manifold 505 can have an opening 535. The hose assembly 200 can include a second hose. The second hose can be the inner hose 240. The inner hose 240 can be disposed, at least partially, in the outer hose 205. The inner hose 240 can enter the outer hose 205 via the opening 535 of the manifold 505. The hose assembly 200 can include at least one support structure 600. The support structure 600 can position at least a portion of the inner hose 240 at a desired position within the outer hose 205.

Some of the description herein emphasizes the structural independence of the aspects of the system components or groupings of operations and responsibilities of these system components. Other groupings that execute similar overall operations are within the scope of the present application. The systems described above can provide multiple of any or each of those components and these components can be provided on either a standalone system or on multiple instantiations in a distributed system.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, references to the electric vehicle 105 can include internal combustion engine vehicles that can include the apparatus as described herein. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a first hose comprising a first hose front end and a first hose rear end, the first hose rear end to couple with a first fluid controller, the first fluid controller to provide a first gas to or receive the first gas from a first object coupled with the first hose via the first hose front end, the first gas having a first pressure;
a manifold coupled with the first hose, the manifold comprising an opening;
a second hose comprising a second hose front end and a second hose rear end, the second hose rear end to couple with a second fluid controller, the second fluid controller to provide a second gas to or receive the second gas from a second object coupled with the second hose via the second hose front end, the second gas having a second pressure, the second pressure greater than the first pressure, the second hose at least partially disposed in the first hose, the second hose to enter the first hose via the opening of the manifold, and the second hose front end disposed at the first hose front end and exposed at the first hose front end; and
a support structure disposed in the first hose, the support structure defining an aperture to receive at least a portion of the second hose, the support structure to position the portion of the second hose at a desired position within the first hose.

2. The apparatus of claim 1, comprising:
the first hose comprising an internal wall; and
the support structure to fix the portion of the second hose at a radial position relative to the internal wall of the first hose.

3. The apparatus of claim 1, comprising:
the first hose comprising an internal wall; and
the support structure comprising a support body and a plurality of support members extending radially from the support body, the plurality of support members to position the support body at a position radially away from the internal wall of the first hose.

4. The apparatus of claim 1, comprising:
a plurality of support structures disposed in the first hose, the plurality of support structures disposed intermittently between the opening and the first hose front end, the plurality of support structures include the support structure.

5. The apparatus of claim 1, wherein the support structure positions the portion of the second hose centrally within the first hose.

6. The apparatus of claim 1, wherein the support structure is disposed in the first hose proximate to the first hose front end to position the second hose front end centrally within the first hose front end.

7. The apparatus of claim 1, comprising:
the first hose to provide a first volume of gas at the first pressure;
the second hose to provide a second volume of gas at the second pressure, the first volume of gas greater than the second volume of gas.

8. The apparatus of claim 1, comprising:
the first hose comprising a first wall thickness;
the second hose having a second wall thickness, the first wall thickness less than the second wall thickness, the second wall thickness to withstand a higher pressure than the first wall thickness.

9. The apparatus of claim 1, comprising:
the manifold disposed closer to the first hose rear end than the first hose front end, the manifold in line with the first hose.

10. The apparatus of claim 1, comprising:
the first hose comprising a front portion and a rear portion; and
the manifold comprising a first manifold end and a second manifold end, the first manifold end coupled with the front portion of the first hose and the second manifold end coupled with the rear portion of the first hose.

11. The apparatus of claim 1, comprising:
the first hose comprising a front portion and a back portion, the front portion comprising the first hose front end and the back portion comprising the first hose rear end;
and
the manifold comprising a first manifold end and a second manifold end, the opening disposed approximately halfway between the first manifold end and the second manifold end, the first manifold end to couple with the front portion of the first hose and the second manifold end to couple with the back portion of the first hose; and
a front portion of the second hose to enter the first hose via the opening and extend along the front portion of the first hose.

12. A method, comprising:
coupling a manifold with a first hose, the manifold comprising an opening and the first hose comprising a first hose front end and a first hose rear end, the first hose rear end to couple with a first fluid controller, the first fluid controller to provide a first gas to or receive the first gas from a first object coupled with the first hose via the first hose front end, the first gas having a first pressure;
inserting a second hose at least partially into the first hose via the opening of the manifold, the second hose having a second hose front end and a second hose rear end, the second hose rear end to couple with a second fluid controller, the second fluid controller to provide a second gas to or receive the second gas from a second object coupled with the second hose via the second hose front end, the second gas having a second pressure, the second pressure greater than the first pressure;
positioning the second hose front end at the first hose front end to be exposed at the first hose front end;
disposing a support structure in the first hose, the support structure defining an aperture to receive at least a portion of the second hose; and
positioning the portion of the second hose at a desired position within the first hose via the support structure.

13. The method of claim 12, comprising:
fixing the portion of the second hose at a radial position relative to an internal wall of the first hose via the support structure.

14. The method of claim 12, wherein the support structure comprises a support body and a plurality of support members, the plurality of support members extending radially from the support body toward an internal wall of the first hose, the method comprising:
positioning the support body at a position radially away from the internal wall of the first hose.

15. The method of claim 12, comprising:
sealing the opening around the second hose to prevent air from escaping the first hose.

16. A vehicle, comprising:
a combined air system, the combined air system comprising:
a first hose comprising a first hose front end and a first hose rear end;
a manifold coupled with the first hose, the manifold comprising an opening; and
a second hose comprising a second hose front end and a second hose rear end, the second hose at least partially disposed in the first hose, the second hose to enter the first hose via the opening of the manifold, and the second hose front end disposed at the first hose front end and exposed at the first hose front end; and
a support structure disposed in the first hose, the support structure defining an aperture to receive at least a portion of the second hose, the support structure to position the portion of the second hose at a desired position within the first hose;
a first air source to couple with the first hose rear end of the first hose, the first air source to provide a first gas to or receive the first gas from a first object coupled with the first hose via the first hose front end, the first gas having a first pressure; and
a second air source to couple with the second hose rear end of the second hose, the second air source to provide a second gas to or receive a second gas from a second object coupled with the second hose via the second hose front end, the second gas having a second pressure, the second pressure greater than the first pressure.

17. The vehicle of claim 16, comprising:
the second object, the second object comprising a suspension system, the second air source to supply air at the second pressure to the suspension system via the second hose.

18. The vehicle of claim 16, comprising:
the second object, the second object comprising a tire, the second hose to provide the second gas with the second pressure air to the tire.

19. The vehicle of claim 16, wherein the combined air system comprises:
the first hose comprising a front portion and a back portion, the front portion comprising the first hose front end and the back portion comprising the first hose rear end;

the second hose comprising a second hose back end to couple with the second air source; and the manifold comprising a first manifold end and a second manifold end, the opening disposed approximately halfway between the first manifold end and the second manifold end, the first manifold end to couple with the front portion of the first hose and the second manifold end to couple with the back portion of the first hose; and a front portion of the second hose to enter the first hose via the opening and extend along the front portion of the first hose.

20. The vehicle of claim 16, wherein the first hose provides the first gas at the first pressure and a first volume and the second hose provides the second gas at the second pressure and a second volume, the second volume less than the first volume.

* * * * *